[12] United States Patent  
Chou et al.

(10) Patent No.: US 8,328,104 B2
(45) Date of Patent: Dec. 11, 2012

(54) STORAGE DEVICE MANAGEMENT SYSTEMS AND METHODS

(75) Inventors: Chi-Yang Chou, Kao-hsiung (TW); Pei-Yen Chou, Hsin-chu (TW); Yeu-Chung Lin, Chang-hua (TW)

(73) Assignee: Condel International Technologies Inc., George Town (KY)

( * ) Notice: Subject to any disclaimer, the term of this patent is extended or adjusted under 35 U.S.C. 154(b) by 275 days.

(21) Appl. No.: 12/414,019

(22) Filed: Mar. 30, 2009

(65) Prior Publication Data

US 2010/0243736 A1 Sep. 30, 2010

(51) Int. Cl.
 *G06K 19/06* (2006.01)
(52) U.S. Cl. .................. 235/492; 235/380; 235/487
(58) Field of Classification Search .................. 235/375, 235/380, 382, 441, 487, 492
 See application file for complete search history.

(56) References Cited

U.S. PATENT DOCUMENTS

| 5,721,781 | A | * | 2/1998 | Deo et al. ................. 705/67 |
| 5,828,751 | A | * | 10/1998 | Walker et al. ............. 713/175 |
| 5,871,398 | A | * | 2/1999 | Schneier et al. ............ 463/16 |
| 5,970,143 | A | * | 10/1999 | Schneier et al. ........... 713/181 |
| 6,083,771 | A | * | 7/2000 | Ward et al. ................. 438/106 |
| 6,179,205 | B1 | * | 1/2001 | Sloan ....................... 235/382 |
| 6,223,291 | B1 | * | 4/2001 | Puhl et al. ................... 726/28 |
| 6,250,557 | B1 | * | 6/2001 | Forslund et al. ............ 235/492 |
| 6,263,438 | B1 | * | 7/2001 | Walker et al. .............. 713/178 |
| 6,273,335 | B1 | * | 8/2001 | Sloan ....................... 235/382 |
| 6,282,648 | B1 | * | 8/2001 | Walker et al. .............. 713/156 |
| 6,463,534 | B1 | * | 10/2002 | Geiger et al. .............. 713/168 |
| 6,745,944 | B2 | * | 6/2004 | Dell ......................... 235/492 |
| 7,136,490 | B2 | * | 11/2006 | Martinez et al. ........... 380/284 |
| 7,140,549 | B2 | * | 11/2006 | de Jong ..................... 235/492 |
| 7,233,926 | B2 | * | 6/2007 | Durand et al. .............. 705/65 |
| 7,562,818 | B1 | * | 7/2009 | Bierbaum et al. .......... 235/384 |
| 7,588,180 | B1 | * | 9/2009 | Carmichael et al. ........ 235/379 |
| 7,676,438 | B2 | * | 3/2010 | Brewer et al. .............. 705/64 |
| 2005/0184165 | A1 | * | 8/2005 | de Jong ..................... 235/492 |
| 2007/0198432 | A1 | * | 8/2007 | Pitroda et al. .............. 705/64 |
| 2007/0274569 | A1 | * | 11/2007 | Brewer et al. .............. 382/115 |
| 2009/0121028 | A1 | * | 5/2009 | Asnaashari et al. ........ 235/492 |

* cited by examiner

*Primary Examiner* — Daniel Hess
*Assistant Examiner* — Paultep Savusdiphol
(74) *Attorney, Agent, or Firm* — McClure, Qualey & Rodack, LLP (57) ABSTRACT

Storage device management systems and methods are provided. The system includes a storage device and an electronic device. The storage device has a UID, and a public area including a plurality of zones. Each zone includes an interpretation module. The electronic device selects one of the zones, reads the interpretation module from the selected zone of the storage device, and executes the interpretation module to read the UID, and interpret the UID as a specific UID. The electronic device manages the storage device locally or remotely based on the specific UID.

19 Claims, 11 Drawing Sheets

STORAGE DEVICE MANAGEMENT SYSTEMS AND METHODS

BACKGROUND OF THE INVENTION

1. Field of the Invention

The disclosure relates generally to storage device management systems and methods, and, more particularly to systems and methods that integrate multiple smart cards into a storage device, and manage the storage device locally or remotely.

2. Description of the Related Art

With electronic devices, such as computers or portable devices, being popular, digital data has become a major data recording type for the devices due to increased convenience of digital data. Digital data is always embodied in a data carrier, such as a storage device. The data carrier may vary according to different requirements and applications.

One popular data carrier is a smart card. The smart card is a pocket-sized integrated circuit. The main components of the smart card include a microprocessor and a non-volatile memory, such as an EEPROM. The smart card can receive and process data, and store the processed data in the non-volatile memory of the smart card or output the processed data. The applications for smart cards may be a SIM (Subscriber Identification Module) card for mobile communications, an ATM card for banking, a health insurance card, an electronic wallet, and others.

A card reader must be employed to use the smart card. Generally, the card reader must be connected with a computer via a USB (Universal Serial Bus) interface. When the smart card is coupled to the card reader, the card reader supplies power to the smart card, so that the smart card can perform related operations, such as data input, reception and processing of ID authentication, data security management, and others.

Currently, portable devices, such as mobile phones are widely used. In some situations, the smart card is connected with a portable device, such as a mobile phone. In these cases, the portable device must be equipped with the USB interface. However, it is inconvenient for users to simultaneously carry a portable device and a card reader. Further, due to design and manufacturing limitations and cost considerations, the storage capacity of these types of smart cards is limited. The storage capacity of a smart card is normally below 100 KB. The storage capacity limitation hinders the development of smart card for a wider range of applications.

Therefore, SD (Secure Digital) cards or micro SD cards with high storage capacity, which are widely used by portable devices, are used to emulate the functions of smart cards. In a conventional application, a smart card is packaged into an SD/micro SD card. The microprocessors of the smart card and the SD/micro SD card communicate via the ISO 7816 protocol. For this case, a lot of SDKs (Software Development Kits) must be involved and software of the portable devices must be re-developed to emulate the smart card reader environment. Additionally, since the portable devices may have various OS (Operating System) platforms, software must be developed for each respective OS platform. Thus, making the software development process complicated and time-consuming. Further, the cost for packaging the smart card in the SD/micro SD card is very high. In another conventional application, the microprocessor design of the SD/micro SD controller is directly modified to integrate the functions of controller of SD/micro SD and the microprocessor of smart card. Additionally, the non-volatile memory of the smart card, EEPROM, is replaced by a flash memory. For this case, since the microprocessor is re-designed, the development cost for the SD/micro SD card is substantially increased. Furthermore, the redesigned controller is not adopted for commodity SD/micro SD card and hence the production requires a long lead time. Additionally, since the data output by the SD/micro SD card still subscribes to the ISO 7816 protocol, the software of the portable devices still require re-development to emulate the smart card reader environment.

Additionally, users must simultaneously carry multiple smart cards since no integration mechanism between smart cards is provided. The integration of smart cards is difficult due to the limited capacity of smart cards and independent security mechanisms controlled by different card organizations.

BRIEF SUMMARY OF THE INVENTION

Storage device management systems and methods, and related storage devices are provided. In some embodiments, storage devices such as SD/micro SD cards are enabled to function as smart cards, and multiple smart cards are integrated into a storage device.

An embodiment of a storage device management system includes a storage device and an electronic device. The storage device has a UID, and a public area including a plurality of zones. Each zone of the public area includes an interpretation module. The electronic device selects one of the zones, reads the interpretation module from the selected zone of the storage device, and executes the interpretation module to read the UID, and interpret the UID as a specific UID. The electronic device manages the storage device locally or remotely based on the specific UID.

In an embodiment of a storage management method, a storage device is provided. The storage device has a UID, and a public area including a plurality of zones, wherein each of the zones has an interpretation module. First, one of the zones is selected. The interpretation module is read from the selected zone of the storage device. The interpretation module is executed to read the UID, and interpret the UID as a specific UID. The storage device is then managed locally or remotely based on the specific UID.

An embodiment of a storage device has a UID and a public area including a plurality of zones. Each of the zones includes an interpretation module. When the storage device is coupled to an electronic device, the electronic device selects one of the zones, and reads the interpretation module from the selected zone of the storage device. The electronic device executes the interpretation module to read the UID, and interpret the UID as a specific UID, and manages the storage device locally or remotely based on the specific UID.

An embodiment of a storage device management system includes a storage device and an electronic device. The storage device includes a plurality of zones, each corresponding to a card organization and including security information for the card organization. The electronic device connects with the storage device, and receives a selection of one of the card organizations. In response to the selection, the electronic device designates one of the zones, accesses the security information from the designated zone, and manages the storage device based on the security information.

An embodiment of a storage device includes a plurality of zones, each corresponding to a card organization and comprising security information for the card organization. When the storage device is connected with an electronic device, the electronic device receives a selection of one of the card organizations, designates one of the zones in response to the selection, accesses the security information from the designated zone, and manages the storage device based on the security information.

In some embodiments, each of the zones further comprises a URL (Uniform Resource Locator) and a security module. The electronic device manages the storage device remotely by reading the security module from the selected zone of the storage device, executing the security module to encrypt the specific UID, linking to a host according to the URL of the selected zone, and transmitting the encrypted UID of the storage device to the host for management.

In some embodiments, the storage device further includes a hidden area having a plurality of zones. Each zone corresponds to one of the zones in the public area, and has a predetermined UID. This zone can be only accessed by the card organization which defines the predetermined UID. The electronic device manages the storage device locally by determining whether the specific UID conforms to the predetermined UID in the zone corresponding to the selected zone in the hidden area of the storage device.

Storage device management methods may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Storage device management systems and methods, and related storage devices are provided.

Figure 1:
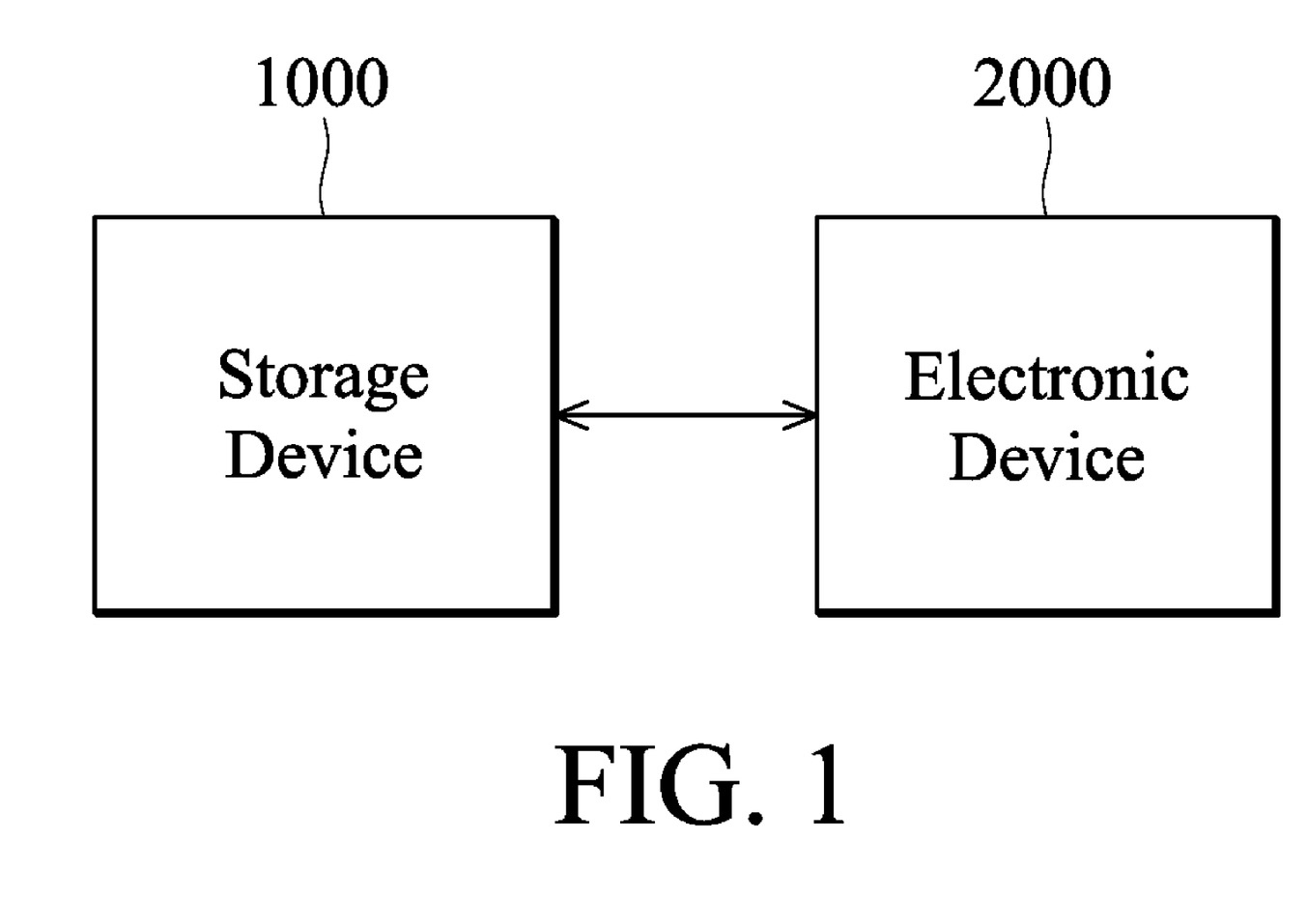
FIG. 1 is a schematic diagram illustrating an embodiment of a storage device management system according to the invention.

FIG. 1 is a schematic diagram illustrating an embodiment of a storage device management system according to the invention.

Figure 2:
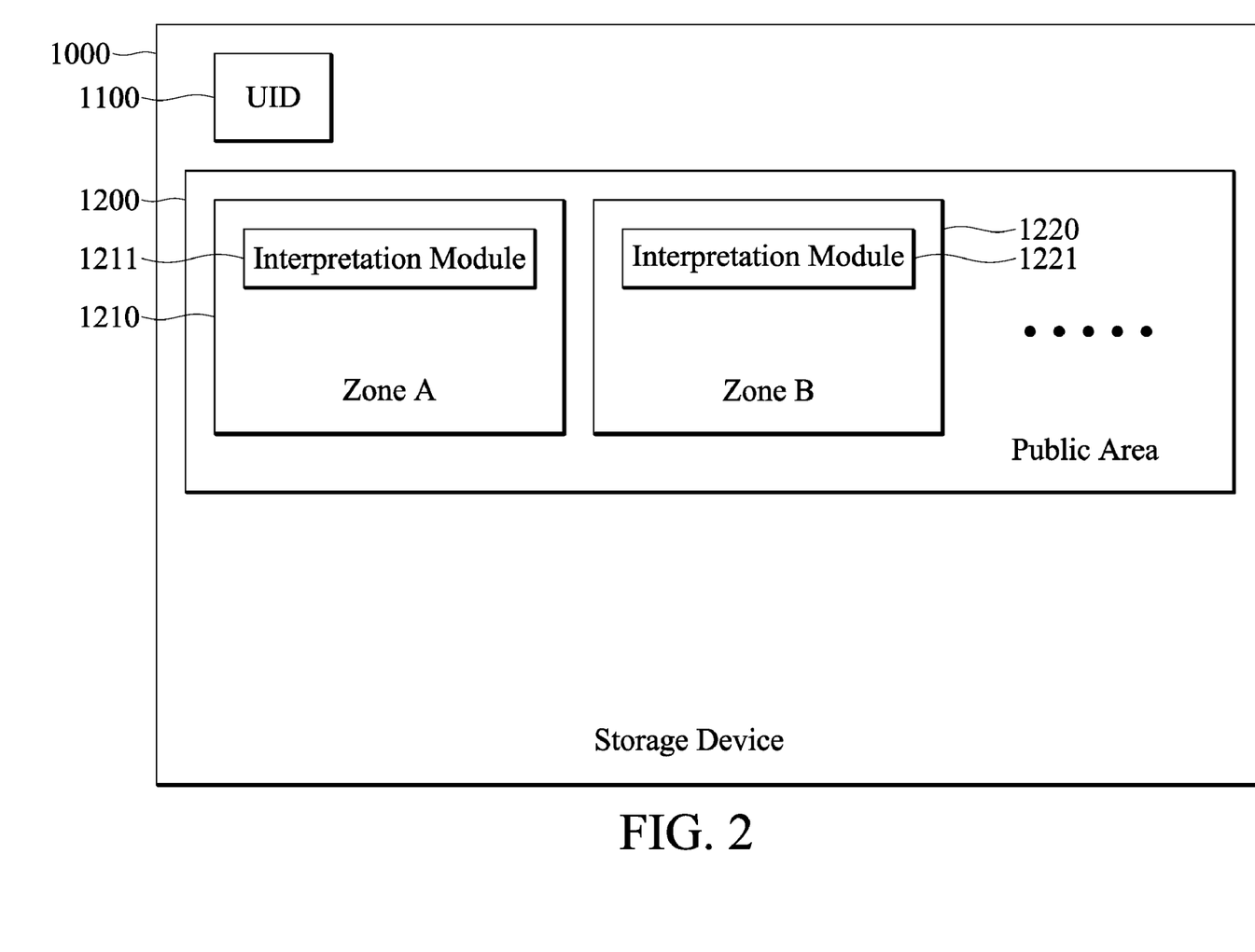
FIG. 2 is a schematic diagram illustrating an embodiment of a storage device according to the invention.

The storage device management system comprises a storage device 1000 and an electronic device 2000 coupled with the storage device 1000. FIG. 2 is a schematic diagram illustrating an embodiment of a storage device according to the invention. The storage device 1000 may be a memory device, such as an SD/micro SD card. The storage device 1000 comprises a UID 1100 and a public area 1200. It is noted that, the storage device 1000 may comprise a semiconductor component, such as a memory, and the UID 1100 is a hardware serial number generated for the semiconductor component during manufacturing or a virtual serial number created for the semiconductor component by firmware/software. The public area 1200 of the storage device 1000 includes a plurality of zones, such as zone A 1210 and zone B 1220. It is understood that, in some embodiments, each zone can be corresponded to a card organization, and may be implemented as a dependent folder. Each zone comprises an interpretation module. For example, zone A 1210 comprises an interpretation module 1211, and zone B 1220 comprises an interpretation module 1221. The interpretation module can be software or hardware-implemented. The interpretation module can read the UID 1100, and interpret the UID 1100 as a specific UID. It is understood that, the interpretation module in different zones may interpret the UID 1100 into different specific UIDs based on different mechanisms or algorithms. In some embodiments, the mechanism or algorithm for the interpretation module can be determined by the respective card organization. The electronic device 2000 may be an electronic device, such as a computer, a portable device such as a mobile phone, or a card reader. When the storage device 1000 is coupled to the electronic device 2000, the electronic device 2000 can read and execute the interpretation module from one of the zones, and locally or remotely manage the storage device 1000 according to the interpretation module based on the UID 1100. Related details are discussed later. It is noted that, in some embodiments, the storage device 1000 may have an account name and password reception module (not shown in FIG. 1). The electronic device 2000 can read and execute the account name and password reception module. When the account name and password reception module is executed, an interface is displayed to prompt users to input an account name and a password. It is understood that, in some embodiments, each of the zones in the public area 1200 of the storage device 1000 may also comprise applications and/or data (not shown). Applications can be read for execution.

Figure 3:
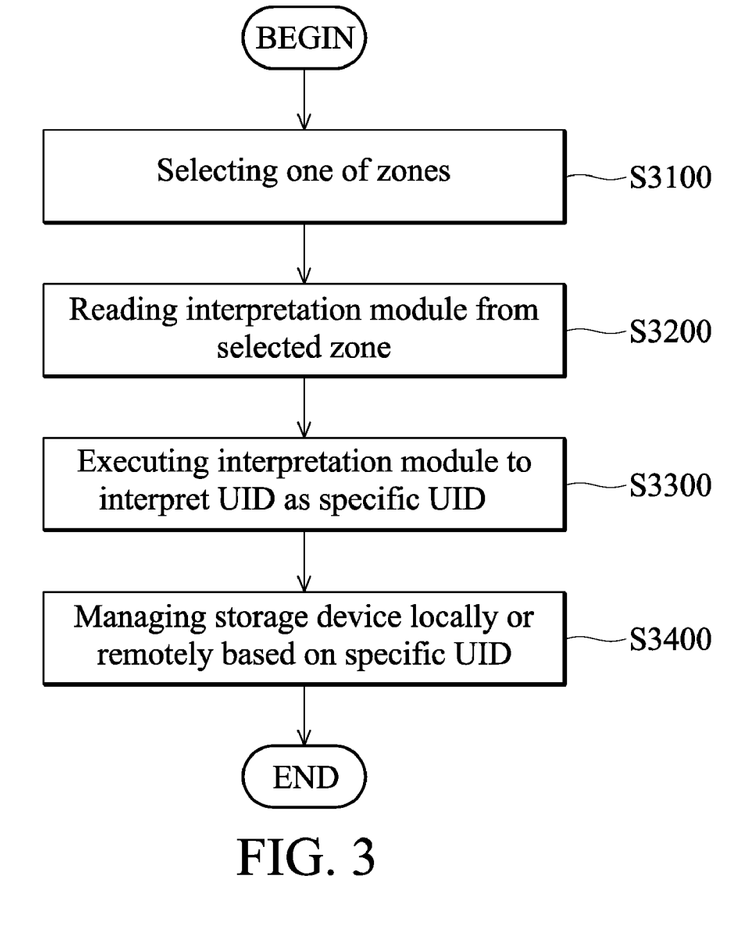
FIG. 3 is a flowchart of an embodiment of a storage device management method according to the invention.

FIG. 3 is a flowchart of an embodiment of a storage device management method according to the invention.

In step S3100, the electronic device 2000 selects one of the zones in the public area 1200. It is understood that, in some embodiments, the selection of zones can be based on a trigger generated by the electronic device 2000 or received from a host remotely. In step S3200, the electronic device 2000 reads the interpretation module from the selected zone of the public area 1200 of the storage device 1000. In step S3300, the electronic device 2000 executes the interpretation module to read the UID 1100, and interpret the UID 1100 as a specific UID. Similarly, the UID 1100 may be a hardware serial number generated for a semiconductor component during manufacturing or a virtual serial number created for the semiconductor component by firmware/software. In step S3400, the electronic device 2000 manages the storage device 1000 locally or remotely based on the specific UID. It is noted that, in some embodiments, the electronic device 2000 may further read related data from the selected zone of the public area 1200 of the storage device 1000, encrypt the data, and accordingly manage the storage device 1000.

Figure 4:
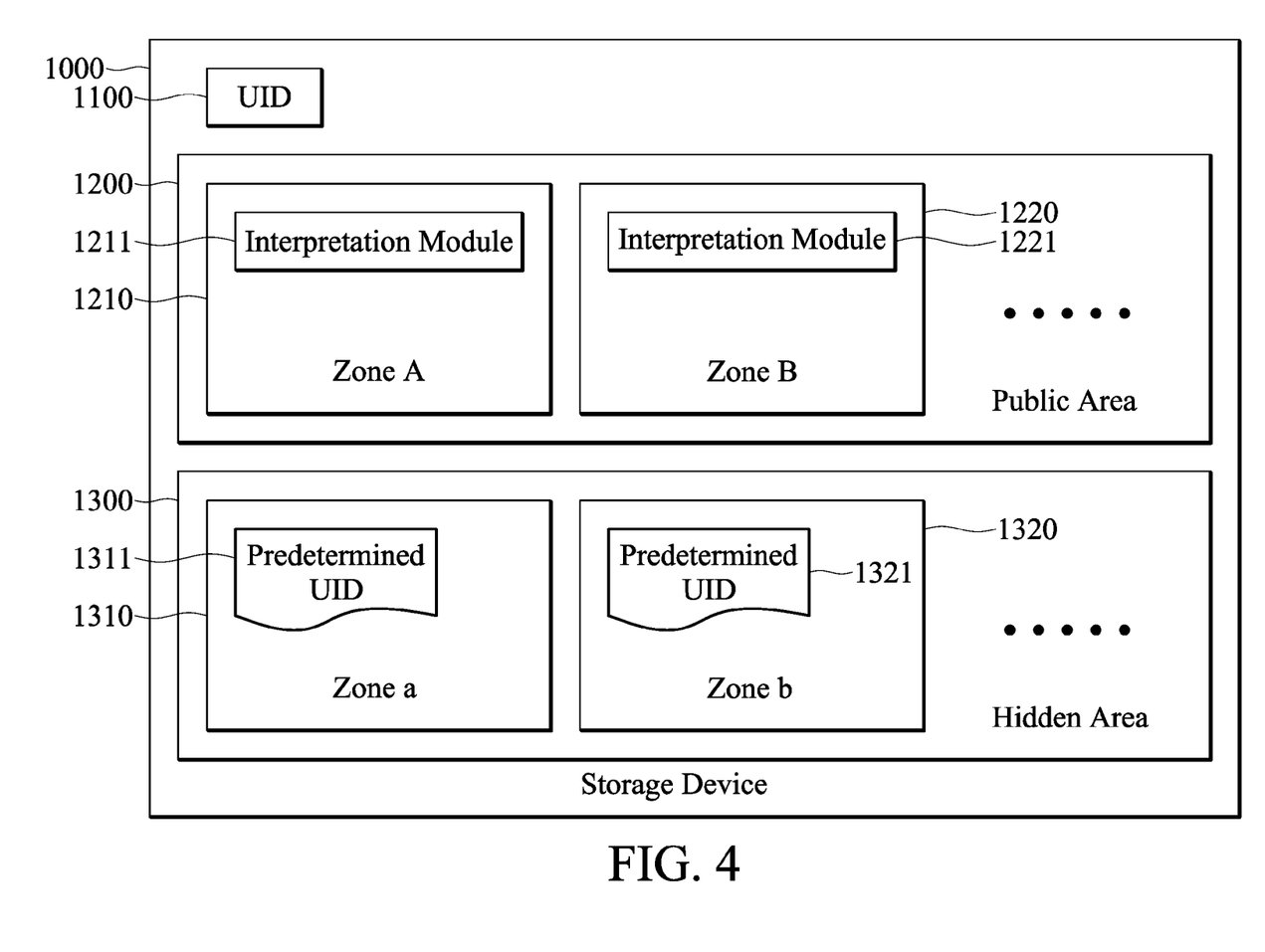
FIG. 4 is a schematic diagram illustrating an embodiment of a storage device for local management according to the invention.

As described, the storage device 1000 can be managed locally or remotely. FIG. 4 is a schematic diagram illustrating an embodiment of a storage device for local management according to the invention. The storage device 1000 comprises a UID 1100, a public area 1200, and a hidden area 1300. Similarly, the UID 1100 is a hardware serial number generated for the semiconductor component during manufacturing or a virtual serial number created for the semiconductor component by firmware/software. The public area 1200 of the storage device 1000 includes a plurality of zones, such as zone A 1210 and zone B 1220. Each zone comprises an interpretation module. The interpretation module can be software or hardware-implemented. The interpretation module can read the UID 1100, and interpret the UID 1100 as a specific UID. The hidden area 1300 of the storage device 1000 includes a plurality of zones, such as zone a 1310 and zone b 1320. It is noted that, each zone in the hidden area 1300 of the storage device 1000 may correspond to one of the zones in the public area 1200 of the storage device 1000. For example, zone a 1310 may correspond to zone A 1210, and zone b 1320 may correspond to zone B 1220. Each zone comprises a predetermined UID. For example, zone a 1310 comprises a predetermined UID 1311, and zone b 1320 comprises a predetermined UID 1321. The predetermined UIDs can be provided by various card organizations, or generated by reading the UID 1100 and interpreting using the respective interpretation modules in advance. The use of the predetermined UID is discussed later. It is noted that, since the hidden area 1300 is protected, the hidden area 1300 can be only accessed via a data retrieval module (not shown) in the public area 1200 of the storage device 1000.

Figure 5:
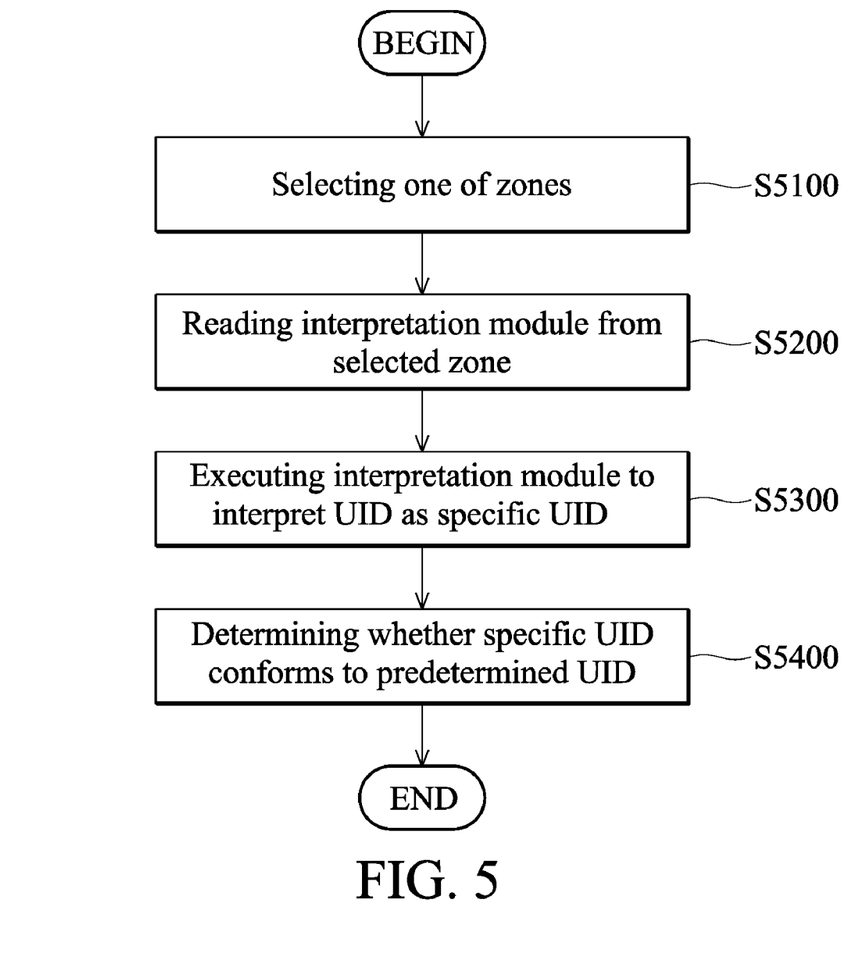
FIG. 5 is a flowchart of an embodiment of a method for locally managing a storage device according to the invention.

FIG. 5 is a flowchart of an embodiment of a method for locally managing a storage device according to the invention.

In step S5100, the electronic device 2000 selects one of the zones in the public area 1200. In step S5200, the electronic device 2000 reads the interpretation module from the selected zone of the public area 1200 of the storage device 1000. In step S5300, the electronic device 2000 executes the interpretation module to read the UID 1100, and interpret the UID 1100 as a specific UID. In step S5400, the electronic device 2000 determined whether the specific UID conforms to the predetermined UID in the zone corresponding to the selected zone in the hidden area 1300 of the storage device 1000. It is understood that, the predetermined UID in the hidden area 1300 can be first read via the data retrieval module, and compared with the specific UID. In some embodiments, when the specific UID conforms to the predetermined UID, the authentication of the storage device 1000 passed. Otherwise, the authentication of the storage device 1000 fails, and a notification of authentication failure is generated.

Figure 6:
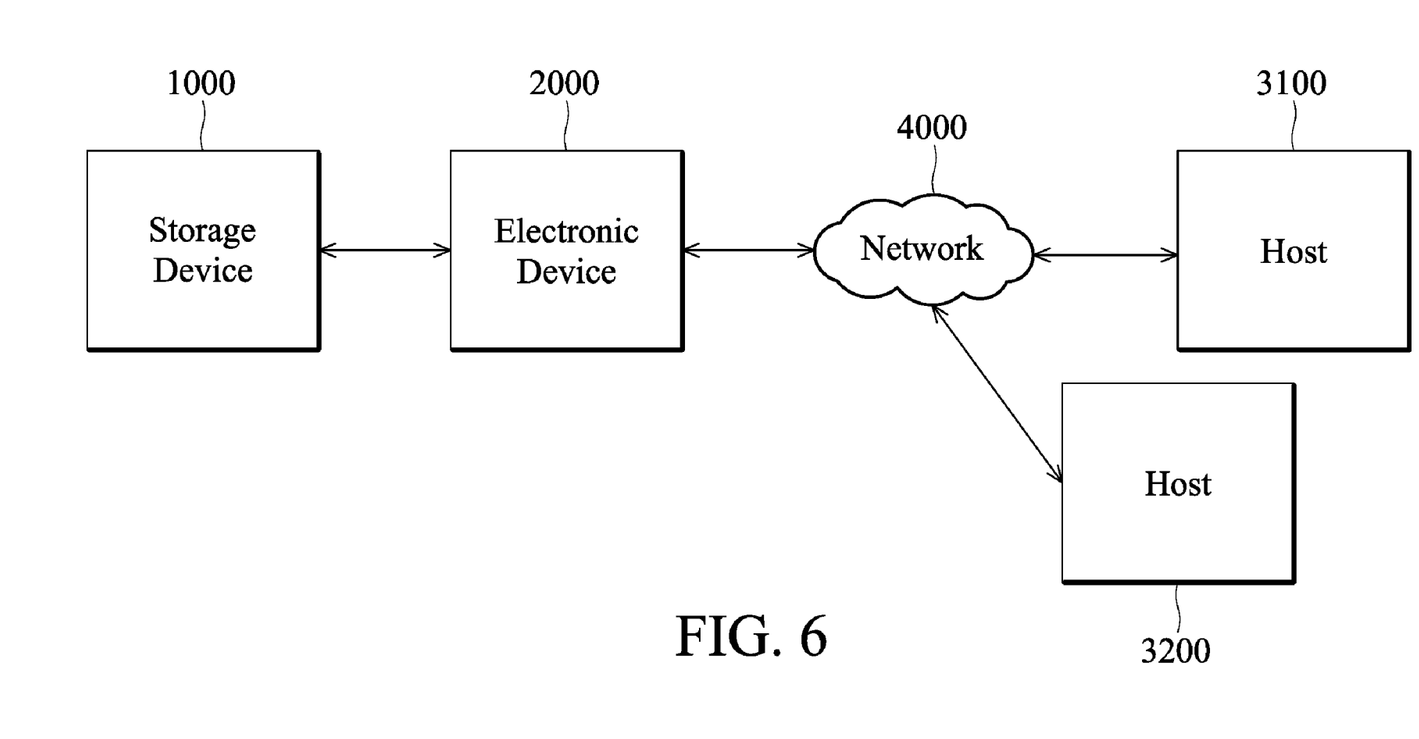
FIG. 6 is a schematic diagram illustrating another embodiment of a storage device management system according to the invention.

FIG. 6 is a schematic diagram illustrating another embodiment of a storage device management system according to the invention. In this embodiment, the storage device is remotely managed.

Figure 7:
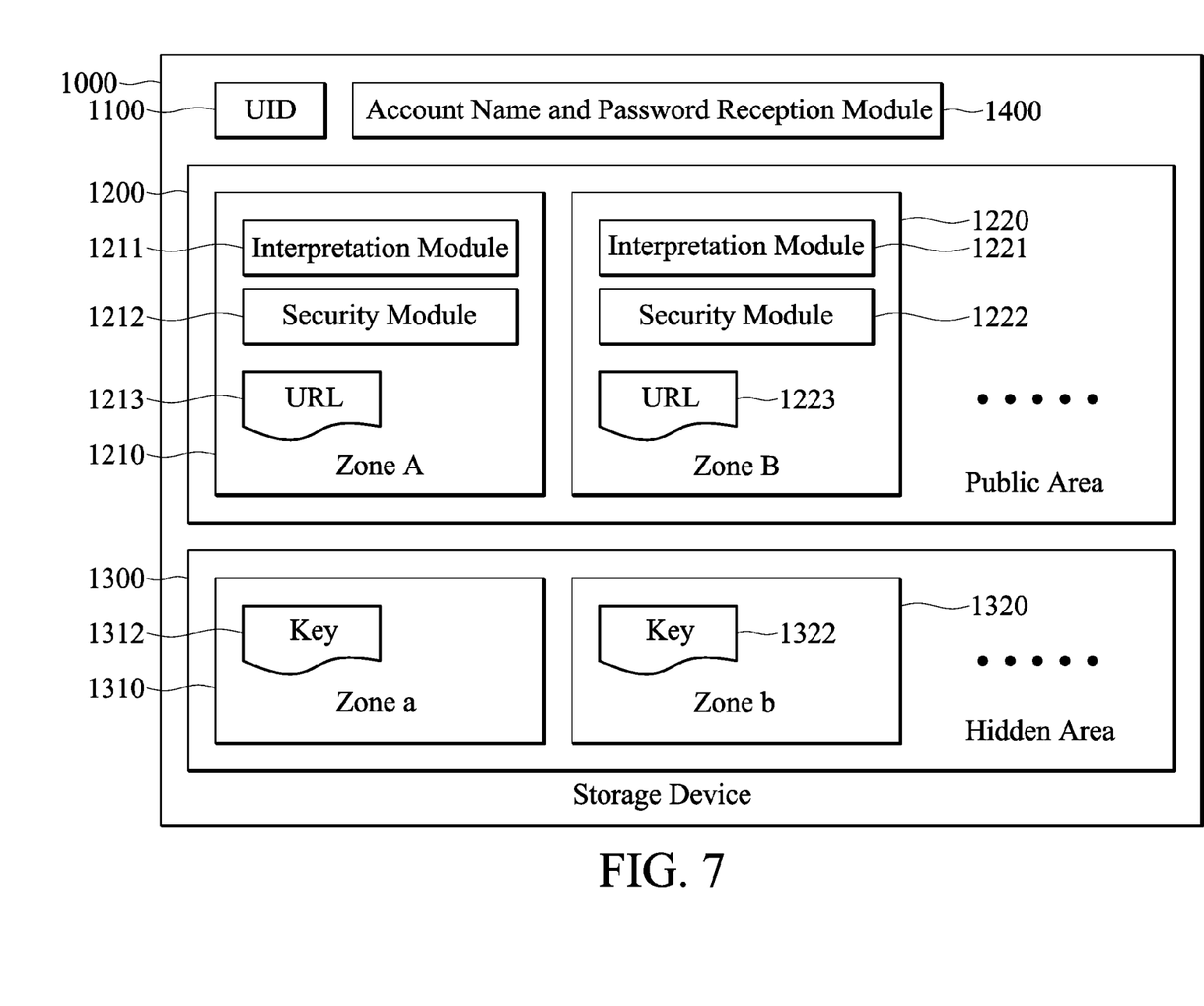
FIG. 7 is a schematic diagram illustrating an embodiment of a storage device for remote management according to the invention.

The storage device management system comprises a storage device 1000, an electronic device 2000, and a plurality of hosts, such as host 3100 and host 3200. FIG. 7 is a schematic diagram illustrating an embodiment of a storage device for remote management according to the invention. The storage device 1000 comprises a UID 1100, a public area 1200, a hidden area 1130, and an account name and password reception module 1400. The public area 1200 of the storage device 1000 includes a plurality of zones, such as zone A 1210 and zone B 1220. Similarly, in some embodiments, each zone can be corresponded to a card organization, and may be implemented as a dependent folder. Each zone comprises an interpretation module, a security module, and a URL of the corresponding host. For example, zone A 1210 comprises an interpretation module 1211, a security module 1212 and a URL 1213, and zone B 1220 comprises an interpretation module 1221, a security module 1222 and a URL 1223. The interpretation module can be software or hardware-implemented. The interpretation module can read the UID 1100, and interpret the UID 1100 as a specific UID. It is understood that, the interpretation module in different zones may interpret the UID 1100 as different specific UIDs based on different mechanisms or algorithms. In some embodiments, the mechanism or algorithm for the interpretation module can be determined by the respective card organization. The security module 1122 may be software-implemented. The security module 1122 may comprise security functions, such as symmetric or asymmetric encryption/decryption algorithms, PKI, and/or a hash function. When the security module 1122 is executed, a security function is performed. It is understood that, the corresponding hosts can be indicated by the respective card organizations. The URL can be used to link with the corresponding host. The hidden area 1300 of the storage device 1000 includes a plurality of zones, such as zone a 1310 and zone b 1320. It is noted that, each zone in the hidden area 1300 of the storage device 1000 may correspond to one of the zones in the public area 1200 of the storage device 1000. For example, zone a 1310 may correspond to zone A 1210, and zone b 1320 may correspond to zone B 1220. Each zone comprises at least one key used for the corresponding security module. For example, zone a 1310 includes a key 1312 used for the security module 1212 in the zone A 1210, and zone b 1320 includes a key 1322 used for the security module 1222 in the zone B 1220. It is noted that, since the keys are in the hidden area 1300, the keys are protected. In some embodiments, the keys in the hidden area 1300 can be only accessed via a data retrieval module (not shown) in the public area 1200 of the storage device 1000. In some embodiments, each of the zones in the public area 1200 and/or the hidden area 1300 of the storage device 1000 may also comprise applications and/or data (not shown). The account name and password reception module 1400 may also be software-implemented. When the account name and password reception module 1400 is executed, an interface is displayed to prompt users to input an account name and a password. It is understood that, in some embodiments, the account name and password reception module can be in the public area 1200 of the storage device 1000, and each zone may have a corresponding account name and password reception module. The electronic device 2000 may be a processor-based electronic device, such as a computer or a portable device such as a mobile phone. When the storage device 1000 is coupled to the electronic device 2000, the electronic device 2000 can read the UID 1100, the account name and password reception module 1400, and the interpretation module, the security module and the URL from one of the zones in the public area 1200 of the storage device 1000. The electronic device 2000 then executes the modules, and performs operations provided by the modules. The electronic device 2000 can link to a host via a network 4000 according to the URL read from the storage device 1000. The network 4000 may be an Internet, and/or a telecommunication network. The host may be a central management system for storage devices. As described, the URL can be used to link with the corresponding host. In this embodiment, the URL 1213 is used to link with the host 3100, and the URL 1223 is used to link with the host 3200. The respective host can receive the encrypted UID, the account name and password input by users, and/or related data from the electronic device 2000, and accordingly perform related management operations. It is understood that, the respective host may also comprise security modules to encrypt/decrypt related data. Related details are discussed later.

Figure 8:
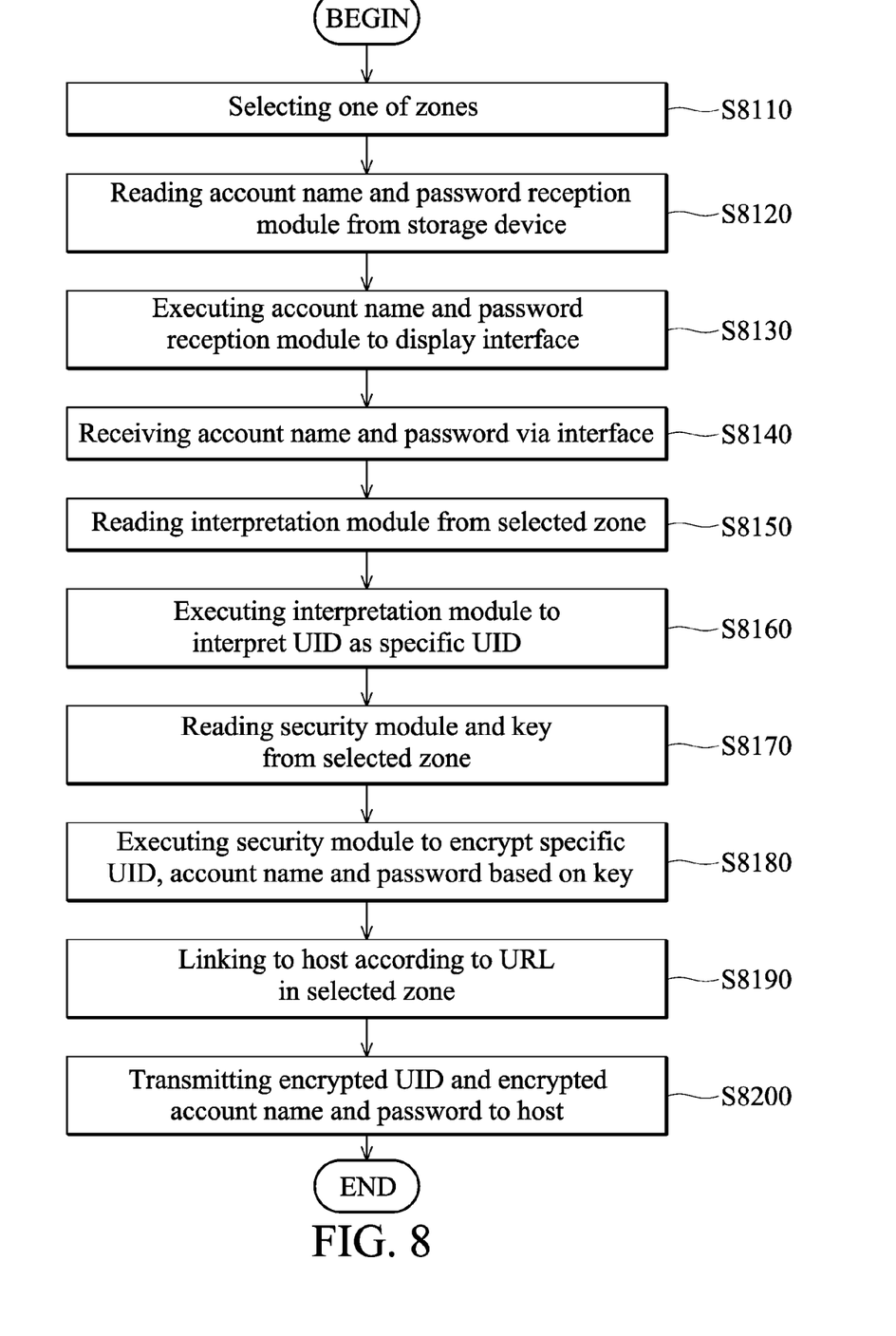
FIG. 8 is a flowchart of an embodiment of a method for remotely managing a storage device according to the invention.

FIG. 8 is a flowchart of an embodiment of a method for remotely managing a storage device according to the invention.

In step S8110, the electronic device 2000 selects one of the zones in the public area 1200. In step S8120, the electronic device 2000 reads the account name and password reception module 1400 from the storage device 1000, and in step S8130, executes the account name and password reception module 1400. When the account name and password reception module 1400 is executed, an interface is displayed to prompt users to input and account name and a password. In step S8140, an account name and a password are received via the interface. In step S8150, the electronic device 2000 reads the interpretation module from the selected zone of the public area 1200 of the storage device 1000. In step S8160, the electronic device 2000 executes the interpretation module to read the UID 1100, and interpret the UID 1100 as a specific UID. In step S8170, the electronic device 2000 reads the security module from the selected zone in the public area 1200 of the storage device 1000, and reads the key from the zone corresponding to the selected zone in the hidden area 1300 of the storage device 1000. Similarly, in some embodiments, the electronic device 2000 may first read the data retrieval module from the public area 1200 of the storage device 1000, and execute the data retrieval module, such that the key in the hidden area 1300 of the storage device 1100 is read via the data retrieval module. In step S8180, the electronic device 2000 executes the security module to encrypt the specific UID and the account name and password based on the key. In step S8190, the electronic device 2000 reads the URL from the selected zone of the public area 1200 of the storage device 1000, and links to a host via the network 4000 according to the URL. In step S8200, the electronic device 2000 transmits the encrypted UID of the storage device 1000, the encrypted account name and password to the host for management. Similarly, in some embodiments, the electronic device 2000 may further read related data from the public area 1200 of the storage device 1000 or the hidden area 1300 of the storage device 1000 via the data retrieval module, encrypt the data, and transmit the encrypted data to the host for management.

Figure 9:
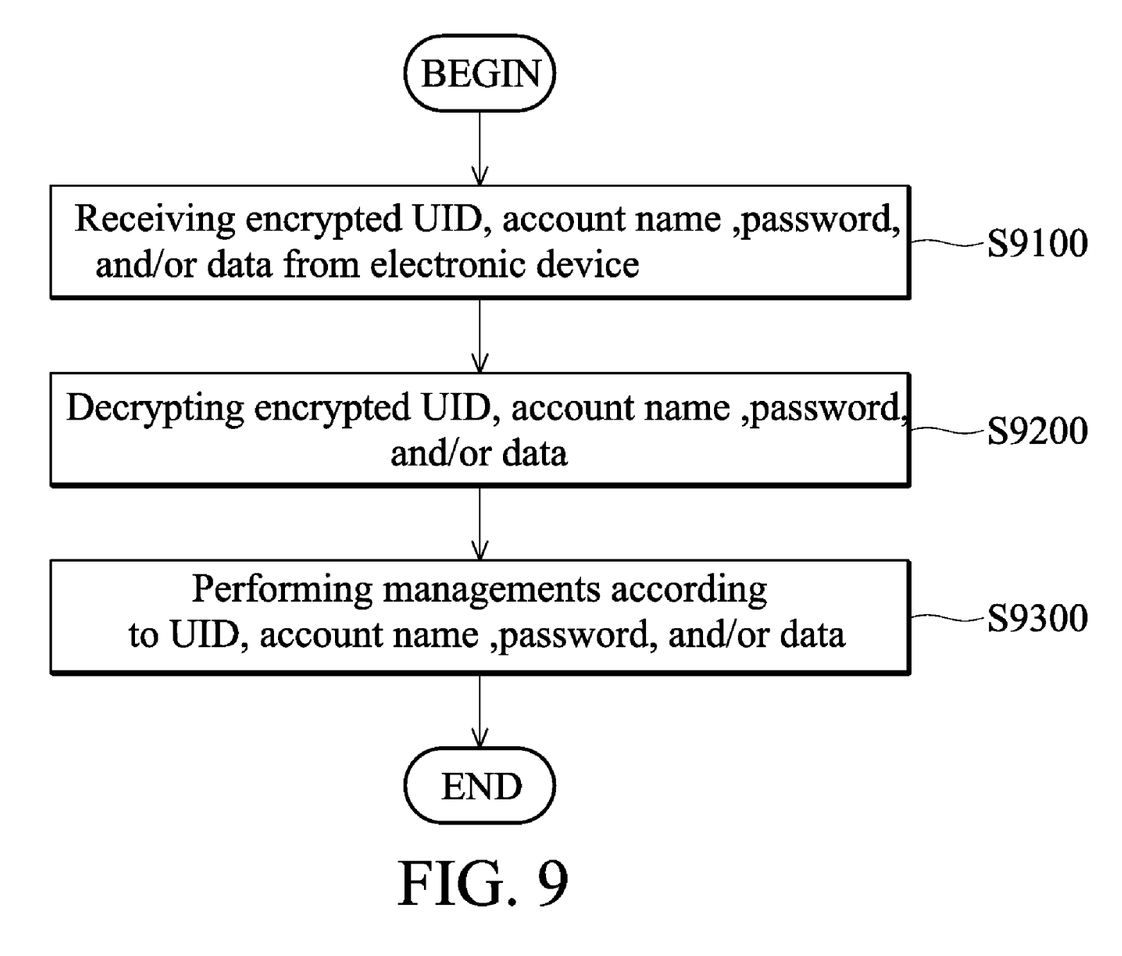
FIG. 9 is a flowchart of an embodiment of a storage device management method on a host according to the invention.

FIG. 9 is a flowchart of an embodiment of a storage device management method on a host according to the invention.

In step S9100, a host receives the encrypted UID of the storage device 1000, the encrypted account name and password, and/or the encrypted data from the electronic device 2000 via the network 4000. In step S9200, the host decrypts the encrypted UID of the storage device 1000, the encrypted account name and password, and/or the encrypted data using an encryption/decryption algorithm and/or a hash function to obtain the specific UID, the account name and password, and/or the data. It is noted that, the encryption/decryption algorithm and/or the hash function must be matched to the security module of the selected zone. In step S9300, the host performs management operations for the storage device 1000 according to the specific UID, the account name and password, and/or the data. It is understood that, in some embodiments, the management operation for the storage device 1000 may be an authentication of the storage device 1000 according to the specific UID of the storage device 1000 and/or the account name and password. In some embodiments, the management operation for the storage device 1000 may be a renewal for the key of the corresponding zone on the storage device 1000. The host can determine whether the key of the corresponding zone in the storage device 1000 is valid. If the key is not valid, the host can determine and update at least one new key to the corresponding zone of the storage device 1000 by way of the network 4000 and the electronic device 2000. In some embodiments, the management operation for the storage device 1000 may be a manipulation of the decrypted data. The host can further update the manipulated data to the corresponding zone of the storage device 1000 by way of the network 4000 and the electronic device 2000. As described, each zone in the public area 1200 of the storage device 1000 may have at least one application, and the electronic device 2000 may read and execute the application. In some embodiments, the management operation for the storage device 1000 may be a software update for the application in the corresponding zone on the storage device 1100 by way of the network 4000 and the electronic device 2000. It is understood that, the new key, the manipulated data, and/or the updated application can be further encrypted by the host, and the electronic device 2000 can execute the corresponding security module to decrypt the new key, the manipulated data, and/or the updated application. It is noted that, the management operation for the storage device 1000 may vary according to different requirements and applications, and is not limited thereto.

Figure 10:
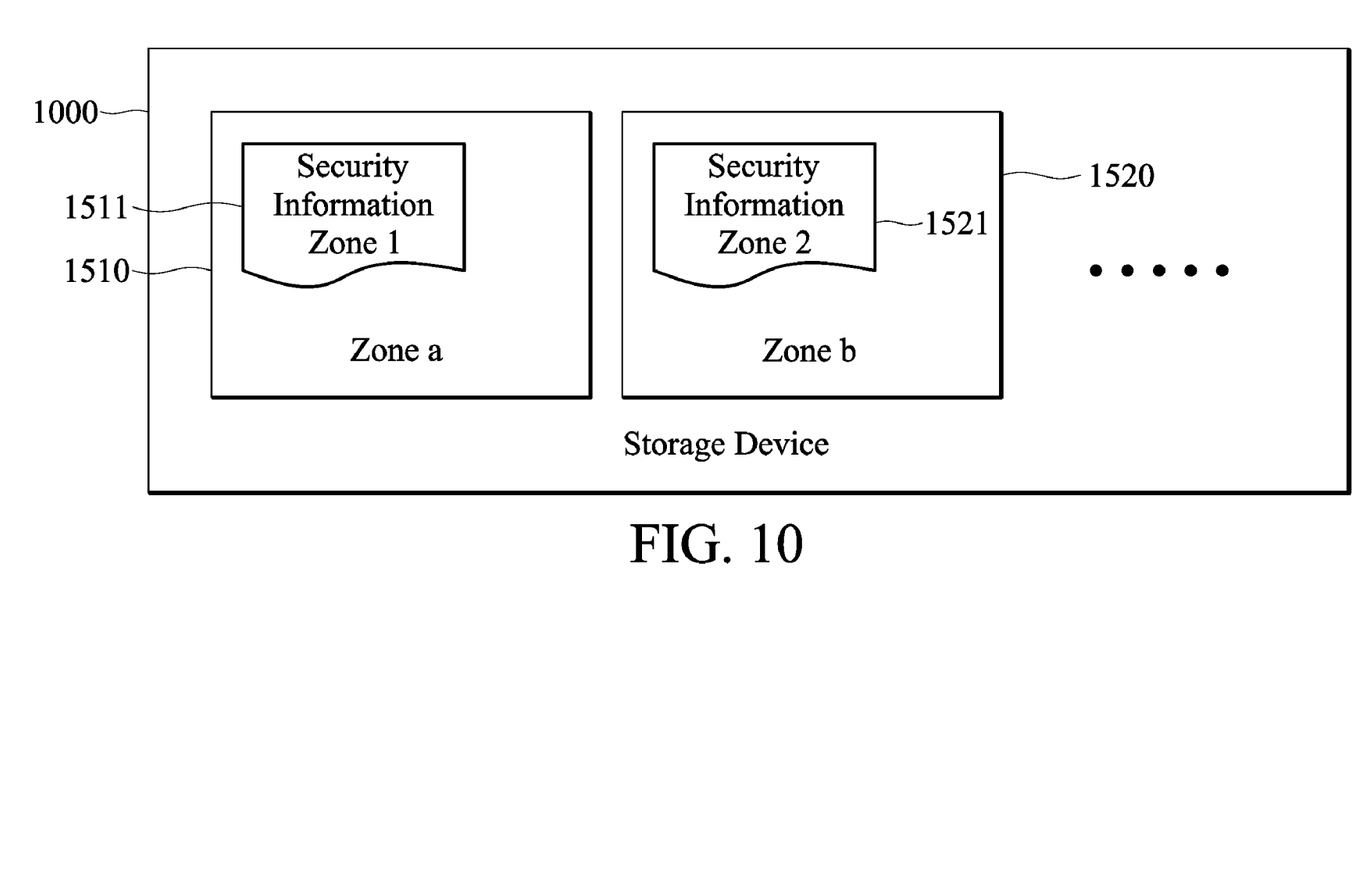
FIG. 10 is a schematic diagram illustrating another embodiment of a storage device according to the invention.

FIG. 10 is a schematic diagram illustrating another embodiment of a storage device according to the invention. In this embodiment, multiple smart cards can be integrated into a storage device regardless of the types of smart cards. For example, multiple SD/micro SD cards respectively packaged with a smart card or multiple SD/micro SD cards with re-designed microprocessors having the functions of SD/micro SD and smart card disclosed in the conventional arts can be also integrated into a storage device.

The storage device 1000 may be a memory device, such as an SD/micro SD card. The storage device 1000 comprises a plurality of zones, such as zone 1 (1510) and zone 2 (1520). It is noted that, the zones may be in a public are or a hidden area of the storage device 1000. Each zone can be corresponded to a card organization, and comprises security information, such as at least one key for the corresponding card organization. For example, zone 1 (1510) comprises security information 1511, and zone 2 (1520) comprises security information 1521. When the storage device 1000 is coupled to the electronic device, the electronic device can select one of the card organizations (zones), and access the security information from the selected zone for subsequent management.

Figure 11:
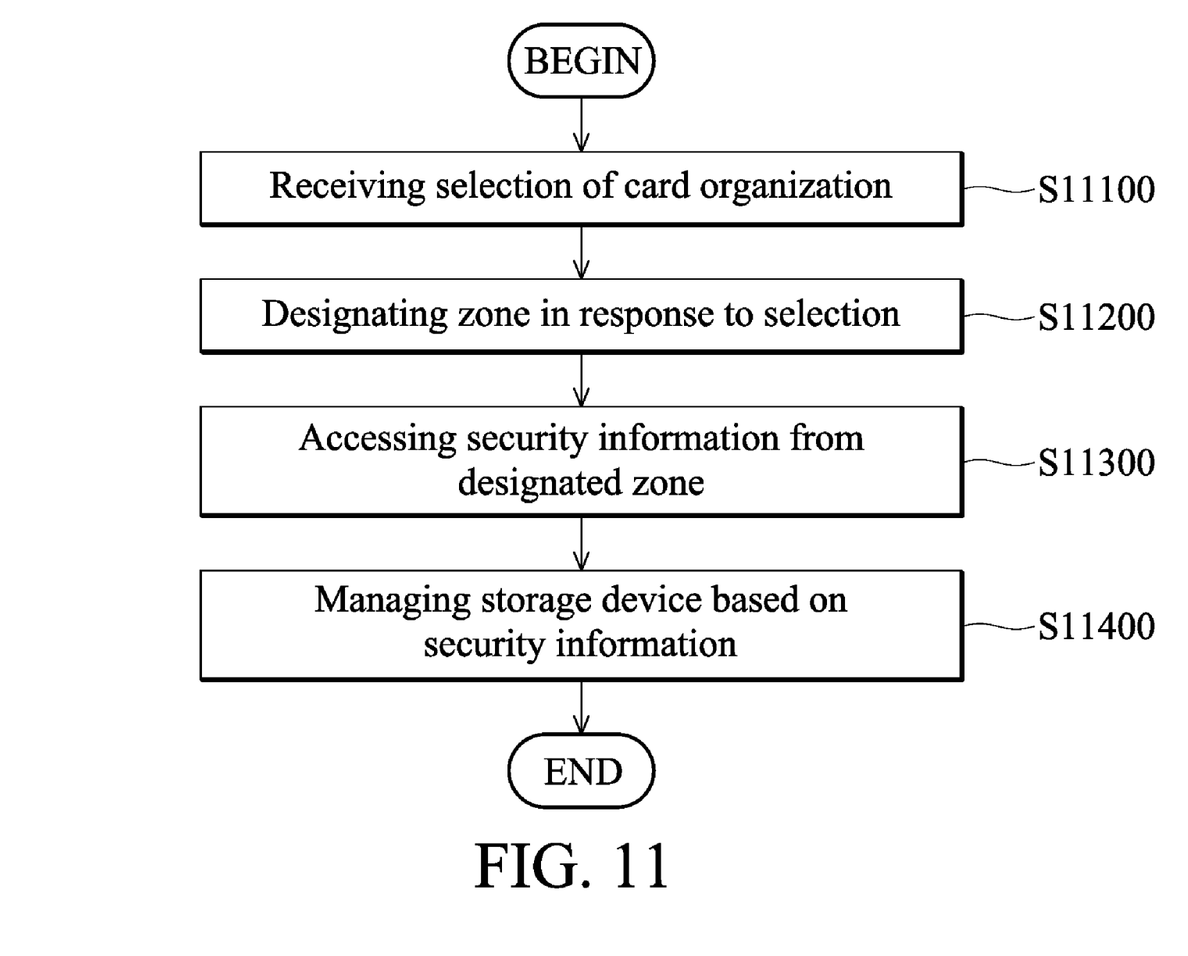
FIG. 11 is a flowchart of another embodiment of a storage device management method according to the invention.

FIG. 11 is a flowchart of another embodiment of a storage device management method according to the invention.

In step S11100, the electronic device 2000 receives a selection of one of the card organizations. It is understood that, in some embodiments, the electronic device 2000 can automatically display an interface to show the card organizations having corresponding zones in the storage device 1000, and prompt users to select one of the card organizations. Additionally, in some embodiments, the selection can be based on a trigger generated by the electronic device 2000 or received from a host remotely. In response to the selection, in step S11200, the electronic device 2000 designates the zone corresponding to the selected card organization. In step S11300, the electronic device 2000 accesses the security information from the designated zone of the storage device 1000. It is noted that, in some embodiments, when a zone is designated, only the designated zone can be accessed, and other zones in the storage device 1000 cannot be accessed for security issues. In step S1400, the electronic device 2000 manages the storage device 1000 based on the security information. Similarly, in some embodiments, the accessed security information can be further encrypted, and the management of the storage device 1000 can be performed locally or remotely.

Therefore, the storage device management systems and methods can integrate multiple smart cards into a storage device, and manage the storage device locally or remotely. For security issues, a specific zone can be assigned for a specific card organization for access, and the interpretation module and the security module can be prepared and written to the storage device by the card organization, respectively.

Storage device management methods, or certain aspects or portions thereof, may take the form of a program code (i.e., executable instructions) embodied in tangible media, such as flash card or USB disk, wherein, when the program code is loaded into and executed by a machine, such as a computer, the machine thereby becomes an apparatus for practicing the methods.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A storage device management system, comprising:
    a storage device having a unique identifier (UID) which is a number physically inscribed on the flash memory semiconductor chip of the storage device and is not stored in the regular flash memory cells or other one-time-programmable memory, comprising:
    a public area, corresponding to the unique identifier, divided into a plurality of zones, each comprising an interpretation module and a specific UID converted from the unique identifier; and
    an electronic device selecting one of the zones, reading the interpretation module from the selected zone of the storage device, executing the interpretation module to read the UID and convert the UID into the specific UID corresponding to the selected zone according to a specific algorithm corresponding to the selected zone, and managing the storage device locally or remotely based on the specific UID.

2. The system of claim 1, wherein each of the zones further comprises a URL (Uniform Resource Locator) and a security module, and the electronic device manages the storage device remotely by reading the security module from the selected zone of the storage device, executing the security module to encrypt the specific UID, linking to a host according to the URL of the selected zone, and transmitting the encrypted UID of the storage device to the host for management.

3. The system of claim 2, wherein the storage device further comprises a hidden area comprising a plurality of zones, each corresponding to one of the zones in the public area, and comprising at least one key, and the electronic device further obtains the key from the zone corresponding to the selected zone in the hidden area of the storage device, and executes the security module to encrypt the specific UID based on the key.

4. The system of claim 2, wherein each of the zones further comprises data, and the electronic device further executes the security module to encrypt the data in the selected zone and transmits the encrypted data to the host.

5. The system of claim 4, wherein the host further performs manipulation of the encrypted data, and updates the manipulated data to the selected zone of the storage device.

6. The system of claim 2, wherein the public area of the storage device further comprises an account name and password reception module, and the electronic device further reads and executes the account name and password reception module to display an interface, receives and account name and a password via the interface, executes the security module to encrypt the account name and password, and transmits the encrypted account name and password to the host.

7. The system of claim 6, wherein the host further decrypts the encrypted UID and the encrypted account name and password, and authenticates the storage device according to the specific UID and the account name and password.

8. The system of claim 1, wherein the storage device further comprises a hidden area comprising a plurality of zones, each corresponding to one of the zones in the public area, and comprising a predetermined UID, and the electronic device manages the storage device locally by determining whether the specific UID conforms to the predetermined UID in the zone corresponding to the selected zone in the hidden area of the storage device.

9. The system of claim 1, wherein each of the zones further comprises an application, and the electronic device further reads the application from the selected zone of the storage device, and executes the application.

10. A storage device management method, comprising:
    providing a storage device having a unique identifier (UID) which is a number physically inscribed on the flash memory semiconductor chip of the storage device and is not stored in regular flash memory cells or other one-time-programmable memory, wherein the storage device comprises a public area, corresponding to the unique identifier and divided into a plurality of zones, and each of the zones comprises an interpretation module and a specific UID converted from the unique identifier;
    selecting one of the zones;
    reading the interpretation module from the selected zone of the storage device;
    executing the interpretation module to read the UID and convert the UID into the specific UID corresponding to the selected zone according to a specific algorithm corresponding to the selected zone; and
    managing the storage device locally or remotely based on the specific UID.

11. The method of claim 10, wherein each of the zones further comprises a URL (Uniform Resource Locator) and a security module, and the step of managing the storage device remotely comprises the steps of:
    reading the security module from the selected zone of the storage device;
    executing the security module to encrypt the specific UID;
    linking to a host according to the URL of the selected zone; and
    transmitting the encrypted UID of the storage device to the host for management.

12. The method of claim 11, wherein the storage device further comprises a hidden area comprising a plurality of zones, each corresponding to one of the zones in the public area, and comprising at least one key, and the method further comprises the steps of:
    obtaining the key from the zone corresponding to the selected zone in the hidden area of the storage device; and
    executing the security module to encrypt the specific UID based on the key.

13. The method of claim 11, wherein each of the zones further comprises data, and the method further comprises steps of:

executing the security module to encrypt the data in the selected zone; and transmitting the encrypted data to the host.

14. The method of claim 13, further comprising:

performing manipulation of the encrypted data by the host; and updating the manipulated data to the selected zone of the storage device.

15. The method of claim 11, wherein the public area of the storage device further comprises an account name and password reception module, and the method further comprises the steps of:

reading and executing the account name and password reception module to display an interface;

receiving an account name and a password via the interface;

executing the security module to encrypt the account name and password; and transmitting the encrypted account name and password to the host.

16. The method of claim 10, wherein the storage device further comprises a hidden area comprising a plurality of zones, each corresponding to one of the zones in the public area, and comprising a predetermined UID, and the step of managing the storage device locally is performed by determining whether the specific UID conforms to the predetermined UID in the zone corresponding to the selected zone in the hidden area of the storage device.

17. The method of claim 16, further comprising:

decrypting the encrypted UID and the encrypted account name and password by the host; and authenticating the storage device according to the specific UID and the account name and password.

18. The method of claim 10, wherein each of the zones further comprises an application, and the method further comprises the steps of reading the application from the selected zone of the storage device, and executing the application.

19. A storage device, having a unique identifier, comprising:

a public area, corresponding to the unique identifier, divided into a plurality of zones, each corresponding to a card organization and a specific UID converted from the unique identifier and comprising security information for the card organization, wherein when the storage device is connected with an electronic device, the electronic device receives a selection of one of the card organizations, designates one of the zones in response to the selection, accesses the security information from the designated zone, and manages the storage device based on the security information, wherein the unique identifier (UID) is a number physically inscribed on the flash memory semiconductor chip of the storage device and is not stored in the regular flash memory cells or other one-time-programmable memory, and a public area comprising a plurality of zones, respectively corresponding to the zones comprising the security information, and each of the zones comprises an interpretation module, wherein when the storage device is connected with the electronic device, the electronic device further reads the interpretation module from the designated zone, executes the interpretation module to read the UID, and interpret the UID as the specific UID, and manages the storage device based on the specific UID and the security information.

* * * * *